United States Patent
Su

(10) Patent No.: US 11,046,015 B2
(45) Date of Patent: Jun. 29, 2021

(54) SYSTEM AND APPARATUS FOR FIBER REINFORCED THERMOPLASTICS JOINER

(71) Applicant: Yibo Su, Cambridge, MA (US)

(72) Inventor: Yibo Su, Cambridge, MA (US)

( * ) Notice: Subject to any disclaimer, the term of this patent is extended or adjusted under 35 U.S.C. 154(b) by 0 days.

(21) Appl. No.: 16/827,917

(22) Filed: Mar. 24, 2020

(65) Prior Publication Data

US 2020/0223149 A1    Jul. 16, 2020

Related U.S. Application Data

(63) Continuation-in-part of application No. 15/988,500, filed on May 24, 2018, now abandoned.

(60) Provisional application No. 62/513,002, filed on May 31, 2017.

(51) Int. Cl.
*B29C 65/06* (2006.01)
*B29C 65/00* (2006.01)
*B29K 101/12* (2006.01)

(52) U.S. Cl.
CPC ...... *B29C 65/0681* (2013.01); *B29C 66/7392* (2013.01); *B29C 66/83* (2013.01); *B29K 2101/12* (2013.01)

(58) Field of Classification Search
CPC ... B29C 65/06; B29C 65/0681; B29C 65/645; B29C 65/7847; B29C 66/00145; B29C 66/112; B29C 66/1122; B29C 66/131; B29C 66/43; B29C 66/472; B29C 66/524; B29C 66/532; B29C 66/5326; B29C 66/71; B29C 66/72141; B29C 66/73921; B29C 66/742; B29C 66/81455; B29C 66/8322; B29C 66/836; B29C 66/863; B29C 66/91212; B29C 66/91221; B29C 66/9241; B29C 66/93451; B29C 73/10; B29C 73/30; B25J 11/00

See application file for complete search history.

(56) References Cited

U.S. PATENT DOCUMENTS

| | | | |
|---|---|---|---|
| 3,134,278 | A | 5/1964 | Hollander |
| 3,701,708 | A | 10/1972 | Brown |
| 3,721,597 | A | 3/1973 | Colburn |
| 3,779,446 | A | 12/1973 | Lemelson |
| 3,917,497 | A | 11/1975 | Stickler |
| 4,090,899 | A | 5/1978 | Reich |
| 4,407,691 | A | 10/1983 | Ishii |
| 4,514,242 | A | 4/1985 | MacLaughlin et al. |
| 4,521,659 | A | 6/1985 | Buckley et al. |
| 5,313,034 | A | 5/1994 | Grimm et al. |
| 5,342,464 | A | 8/1994 | McIntire et al. |
| 5,460,317 | A | 10/1995 | Thomas et al. |
| 6,543,671 | B2 | 4/2003 | Hatten et al. |

(Continued)

FOREIGN PATENT DOCUMENTS

| | | |
|---|---|---|
| EP | 1738857 | 1/2007 |
| WO | 2003/015935 | 2/2003 |

*Primary Examiner* — George R Koch
(74) *Attorney, Agent, or Firm* — Bay State IP, LLC

(57) ABSTRACT

A system for, and method making and repairing a fiber-reinforced component including bonding a first thermoplastic matrix possessing reinforcing fibers distributed therein to a second composite member possessing a thermoplastic matrix with reinforcing fibers distributed therein; and metals and more particularly a method and apparatuses for joining fiber reinforced thermoplastics utilizing a combination of heat, force and rotational force.

4 Claims, 10 Drawing Sheets

(56) References Cited

U.S. PATENT DOCUMENTS

| | | |
|---|---|---|
| 7,507,310 B2 | 3/2009 | Manicke et al. |
| 8,186,566 B2 | 5/2012 | Abramovici et al. |
| 8,563,079 B2 | 10/2013 | Suulivan et al. |
| 9,333,703 B2 | 5/2016 | Goehlich |
| 2001/0006170 A1 | 7/2001 | Moench |
| 2003/0205565 A1* | 11/2003 | Nelson .............. B29C 66/81811 219/148 |
| 2006/0289603 A1 | 12/2006 | Zettler |
| 2011/0131784 A1 | 6/2011 | Filho et al. |
| 2011/0132970 A1* | 6/2011 | Nakagawa ........ B29C 66/81431 228/112.1 |
| 2016/0250804 A1* | 9/2016 | Wang .................. B29C 66/8322 403/267 |
| 2016/0325509 A1 | 11/2016 | Prebil et al. |

* cited by examiner

SYSTEM AND APPARATUS FOR FIBER REINFORCED THERMOPLASTICS JOINER

CROSS REFERENCE TO RELATED APPLICATION

This application is a Continuation-in-part application that takes priority from and claims the benefit of U.S. patent application Ser. No. 15/988,500, filed on May 24, 2018, which takes priority from and claims the benefit of U.S. Provisional Application Ser. No. 62/513,002, filed on May 31, 2017, the contents of which are herein incorporated by reference.

BACKGROUND OF THE INVENTION

Field of the Invention

The present system pertains to apparatuses and methods for joining fiber reinforced thermoplastics to fiber reinforced thermoplastics and metals and more particularly a method and apparatuses for joining fiber reinforced thermoplastics using heat through friction.

Description of the Related Art

Lightweight structures show remarkable advantages in various industrial sectors and products. A prevalent approach to reducing the weight of structural components is to involve fiber reinforced polymer material into product design and fabrication. Fiber reinforced polymer consists of high strength reinforcement fiber embedded in a polymer matrix which can be either thermoset polymer or thermoplastic polymer. In comparison with thermoset counterparts as mature and widely applied polymer matrices, fiber reinforced thermoplastics have many advantages. Fiber reinforced thermoplastics show higher fracture toughness, i.e. the capability of withstanding crack growth through fiber-matrix interface. This property increases the service life and safety performance of products. Fiber reinforced thermoplastics can be stored with a longer shelf time and more flexible storage condition.

Additionally, Fiber reinforced thermoplastics also lower flammability and show higher service temperatures. Once shaped and cured, fiber reinforced thermosets may not be reheated and reshaped. In contrast, fiber reinforced thermoplastics can be reheated and reformed. Therefore fiber reinforced thermoplastics are recyclable and can be processed in more versatile techniques.

As a consequence, fiber reinforced thermoplastics are currently receiving an increasing amount of attention from various industrial sectors. It should be noted that in practical application, particularly for facilitating load introduction, the fiber reinforced thermoplastic component needs to be joined with other components such as another fiber reinforced thermoplastic component or a metal component. This is because the fiber reinforced polymer joint structures have been extensively employed in different industrial sectors and products. For example, the aviation industry has a long history of utilizing fiber reinforced polymer due to its manner of high strength-weight ratio. The most recent released civil aircrafts, the Boeing 787 and Airbus A350, each employ a fiber reinforced polymer fuselage which is fabricated by joining a number of fuselage sections. The application of fiber reinforced polymer in the automotive industry is still limited to the relatively high cost of the fiber reinforced polymer. However, the automotive industry is attempting to reduce the weight of metal automotive structures the strength of which are maintained by joining fiber reinforced polymers to heavily loaded locations. The application of lightweight automotive structures is stimulated by the EU climate action law which urges automotive manufacturers to reduce $CO_2$ emission of their products by 40% from 2007 to 2021. In civil engineering, fiber reinforced polymers can be joined with steel structures to reinforce the strength of the structure, or to offer a protection of steel structure from corrosion.

Currently, methods of joining fiber reinforced thermoplastic to fiber reinforced thermoplastic and metal can be classified into the following categories: Mechanical fastening, adhesive bonding, co-consolidation and welding. Fiber reinforced thermoplastic components can be mechanically fastened with another fiber reinforced thermoplastic component and metal component by employing fasteners such as screws or rivets. In this case, the inevitable drilling process introduces stress concentration in components, which process also breaks the reinforced fiber of the region adjacent to drilled holes. As a consequence, the service life and safety performance of the joint structure is deteriorated by employing mechanical fastening. In addition, the employment of fasteners will add extra cost and weight to the structural components. Since fiber reinforced thermoplastics are usually served in high temperature applications, therefore conventional adhesives, such as epoxy based adhesive, are not suitable for joining fiber reinforced thermoplastics. In addition, adhesive bonding requires complicated surface preparation prior to joining. The joining processing time, i.e. curing of the adhesive, is quite long and the cost of adhesive is additional to the cost of the structural components.

The co-consolidation process integrates the consolidation of fiber reinforced thermoplastic and the joining of fiber reinforced thermoplastic and fiber reinforced thermoplastic/metal in the same process. This technique employs the thermoplastic resin presented in the fiber reinforced thermoplastic as the adhesive, therefore, no pretreatment of the fiber reinforced thermoplastic is needed and no separate curing time is needed for the adhesive. Since this process integrates joining process with consolidation process which requires sophisticated and expensive equipment with substantive cost of energy and time, the co-consolidation process is more suitable in fabricating a fiber reinforced thermoplastic component with designed joint features, but not as a fast and economic process to join fiber reinforced thermoplastic component or metal component to an existing fiber reinforced thermoplastic component.

The welding technique, also known as the fusion bonding technique, is widely employed in joining fiber reinforced thermoplastics by employing heat to melt the thermoplastic at the fiber reinforced thermoplastic-fiber reinforced thermoplastic interface to achieve a polymer chain inter-diffuse to form joining. However, most of the welding technique requires elaborate and specific equipment and a specific design of the joined components. Some of the techniques and equipment are only applicable for the components with specific geometry. In addition, some welding techniques are not capable to accurately control the welding parameters, which further results in inconsistent welding quality.

Accordingly, the present invention is directed to propose an apparatus which is able to join fiber reinforced thermoplastics with fiber reinforced thermoplastics and metal in an efficient, easy to use and inexpensive manner.

SUMMARY OF THE INVENTION

The instant system, series of apparatuses and method of usage, as illustrated herein, are clearly not anticipated, rendered obvious, or even present in any of the prior art mechanisms, either alone or in any combination thereof. Thus the several embodiments of the instant apparatus are illustrated herein.

The present invention discloses a method of joining fiber reinforced thermoplastics to fiber reinforced thermoplastics and metals. The present invention further discloses an apparatus, to realize the joining process in combination with the joining method.

An objective of the present invention is to disclose a novel thermoplastics joining method and apparatus to utilize external heat to melt the thermoplastic resin of fiber reinforced thermoplastics prepared for joining. For joining fiber reinforced thermoplastic to fiber reinforced thermoplastic, the molten thermoplastic resin from each fiber reinforced thermoplastic will inter-diffuse with each other to form robust joining. For joining fiber reinforced thermoplastic to metal, the molten thermoplastic resin can flow into the intrinsic surface irregularity of metal to form a strong mechanical keying. It should be noted that, according to different material combination, the existence of oxygen may either promote the joining strength or deteriorate it. Thus the joining may be operated under vacuum atmosphere for better performance.

It is a further objective of the present method and apparatus to utilize a rotating element in contact with a stationary element to generate frictional heat for joining. The stationary element is meanwhile in contact with the fiber reinforced thermoplastic to conduct heat in order to melt the thermoplastic resin underneath the contacted region between rotating element and stationary element. Meanwhile, a quantity of certain downward force is subjected from the rotating element to the stationary element to ensure an intimate contact between the joining regions of joined components; therefore a supporter may be required to support the joined components from displacement caused by the downward force. When the temperature of the joining region cools down due to the removal of the frictional heat, the thermoplastic resin at the joining region will solidify and form the joining.

The instant system also discloses a novel fiber reinforced thermoplastics joining apparatus that is easy to use, easy to install, light weight, inexpensive, and efficient.

There has thus been outlined, rather broadly, the more important features of the fiber reinforced thermoplastics joining method and apparatus in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which having thus described the system in general terms, reference will now be made to the accompanying drawings, which are not necessarily drawn to scale, and wherein.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
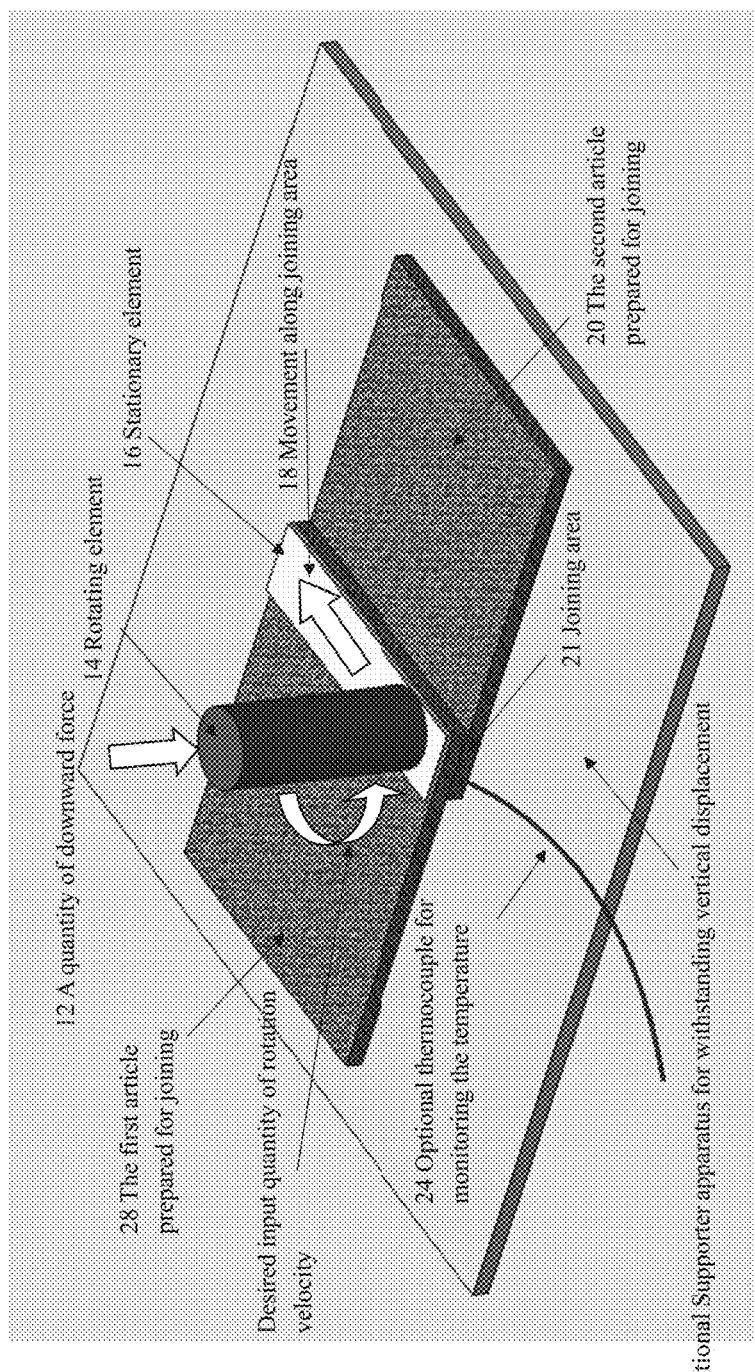
FIG. 1 illustrates a perspective view of a mechanical schematic of the operation of the joining method.

FIG. 1 illustrates a perspective view of a mechanical schematic of the operation of the joining method. Prior to joining, the first article prepared for joining 28 and the second article prepared for joining 20 are overlapped to form the joining area 21 which is covered by the stationary element 16. The stationary element 16 is temporarily fixed to ensure the joining area 21 is consistently covered by the stationary element 16 which furthermore will be removed from the joining area 21 after the joining process. The stationary element 16 comprises low cost materials with large thermal conductivity, e.g. aluminum alloy, since the stationary element 16 is working as consumable in this process.

The joining process comprises the rotating element 14 rotating under a designated quantity of rotation velocity which approaches the stationary element 16. Heat is created as a result of the contact between the rotating element 14 and stationary element 16 through the friction between the rotating element 14 and the stationary element 16. The rotating element 14 is suggested to be constructed in a cylinder shape with high hardness materials to reduce the friction wear. The aforementioned heat will melt the thermoplastic resin 38 in fiber reinforced thermoplastic articles adjacent to the rotating element 14. In one embodiment, fiber reinforced thermoplastic and fiber reinforced thermoplastics are joined due to the inter-diffusion between the polymer chains, and the fiber reinforced thermoplastic and metal are joined by forming metal-thermoplastic bonding.

A designated downward force 12 is subjected through the rotating element 14 to this molten region 40, which will induce an intimate contact between the first article of thermoplastic material 28 and the second article of thermoplastic material 20 within this molten region 40. Such intimate contact will reduce the amount of entrapped air between the first and the second article to offer a high quality joining.

Since the initiation of the contact between rotating element and stationary element, after a designated period of waiting time, a designated temperature of the joining area underneath rotating element is reached, afterwards the rotating element 14 will leave this molten region 40 to move across the joining area 21 under a designated quantity of movement velocity, meanwhile the rotating velocity is maintained. The molten thermoplastic resin 40 cools down when rotating element 14 leaves, the molten thermoplastic resin 40 will solidify again resulting in an accomplished joining.

It should additionally be noted that utilization of a support mechanism underneath the joined area may be required in order to withstand the vertical displacement of the articles.

The following paragraphs detail the operating parameters in applying this invention:

The length of the rotating element should not exceed a certain value to avoid buckling, which is suggested to be shorter than five times of the diameter of rotating element. The determination of suitable diameter of rotating element is according to the shape and size of joining area, which should be designed to minimize the movement distance of rotating element to minimize the tool wear. For example, FIG. 1 shows a rectangular joining area with a certain width and length, therefore the diameter of rotating element can be designated to equal to the width of joining area.

The area and shape of stationary element should at least fully cover the joining area as the example shown in FIG. 1. The thickness of stationary element is suggested to be between 2 mm to 4 mm for aluminum alloy. Too thick stationary element can result an excessed time of reaching the designated temperature of the joining area, which reduces the efficiency of joining. Too thin stationary element can be quickly worn, which may result the rotating element penetrate through the stationary element and damage the material of the joining area. Therefore, it is suggested to measure the thickness of stationary element before joining. If the thickness of the used stationary element is lower than 50% of the original stationary element, then a new stationary element is required.

The velocity of rotating element influences the time of reaching the designated temperature and the maximum reachable temperature of the joining area. The designated temperature suitable for joining, is dependent to the melting point of matrix material of thermoplastic composite. The joining temperature should not be lower than the melting point. In addition, by elevating the joining temperature, a faster joining process can be achieved due to a faster polymer diffusion. However, a too high temperature will degrade the thermoplastic matrix resulting a low joining strength. The joining temperature is suggested to be calculated as the melting point of thermoplastic plus 50 degree of Celsius. For example, 393 degree of Celsius is suitable for joining fiber reinforced poly ether ether ketone (PEEK) with a melting point of 343 degree of Celsius. The following chart shows an example of the maximum reachable temperature and time of reaching the maximum temperature of the joining area underneath the rotating element as a function of different velocity of rotating element, which is measured by using a 30 mm diameter hardened steel rotating element and aluminum alloy stationary element with 4 mm thickness. According to chart, 400 or 500 RPM can be used as suitable rotating velocity. The aforementioned designated waiting time can be equal to the time of reaching maximum temperature which can be read from the embedded thermometer in rotating element.

TABLE 1

| Rotating velocity (RPM) | 200 | 300 | 400 | 500 | 600 | 700 |
|---|---|---|---|---|---|---|
| Max reachable temperature (° C.) | 304 | 335 | 428 | 422 | 478 | 467 |
| Time of reaching max temperature (s) | 255 | 204 | 184 | 156 | 145 | 134 |

The velocity of movement of rotating element across the joining area determines the total time required for joining. After the temperature of the joining area underneath the rotating element reaches the maximum temperature, it is suggested to maintain the position of rotating element for at least 1 second to realize complete joining, then the rotating element can start to move to the adjacent location of joining area, i.e. the minimum time for translating the rotating element from its original location to the adjacent location without overlap or gap should be 1 second. Therefore, the maximum velocity of movement is calculated as diameter of rotating element per second.

The subjected downward force is suggested to be capable to generate a pressure of 0.2 to 2 MPa to the joining area underneath the rotating element, i.e. Subjected force (N)=Area of rotating element (mm$^2$) multiply 0.2 to 2 MPa.

The performance of joining can be evaluated by measuring the shear strength of the joint. For example, the shear strength of a carbon fiber reinforced poly ether ether ketone-aluminum alloy joint can reach a value of 12 MPa, which is far stronger than the shear strength of epoxy adhesive bonded joint as 7 MPa. The joining parameter of realizing such performance is introduced as:

Rotating element: Hardened steel, 10 mm diameter, 60 mm length
Stationary element: Aluminum alloy, 4 mm thickness
Joining area: 30 mm by 30 mm
Rotating velocity: 400 RPM
Velocity of moving: 1 mm/s
Waiting time: 200 s For pragmatic application of the overall process, the steps illustrated in FIG. 10 should be utilized in order to ensure a high quality joining.

Figure 2:
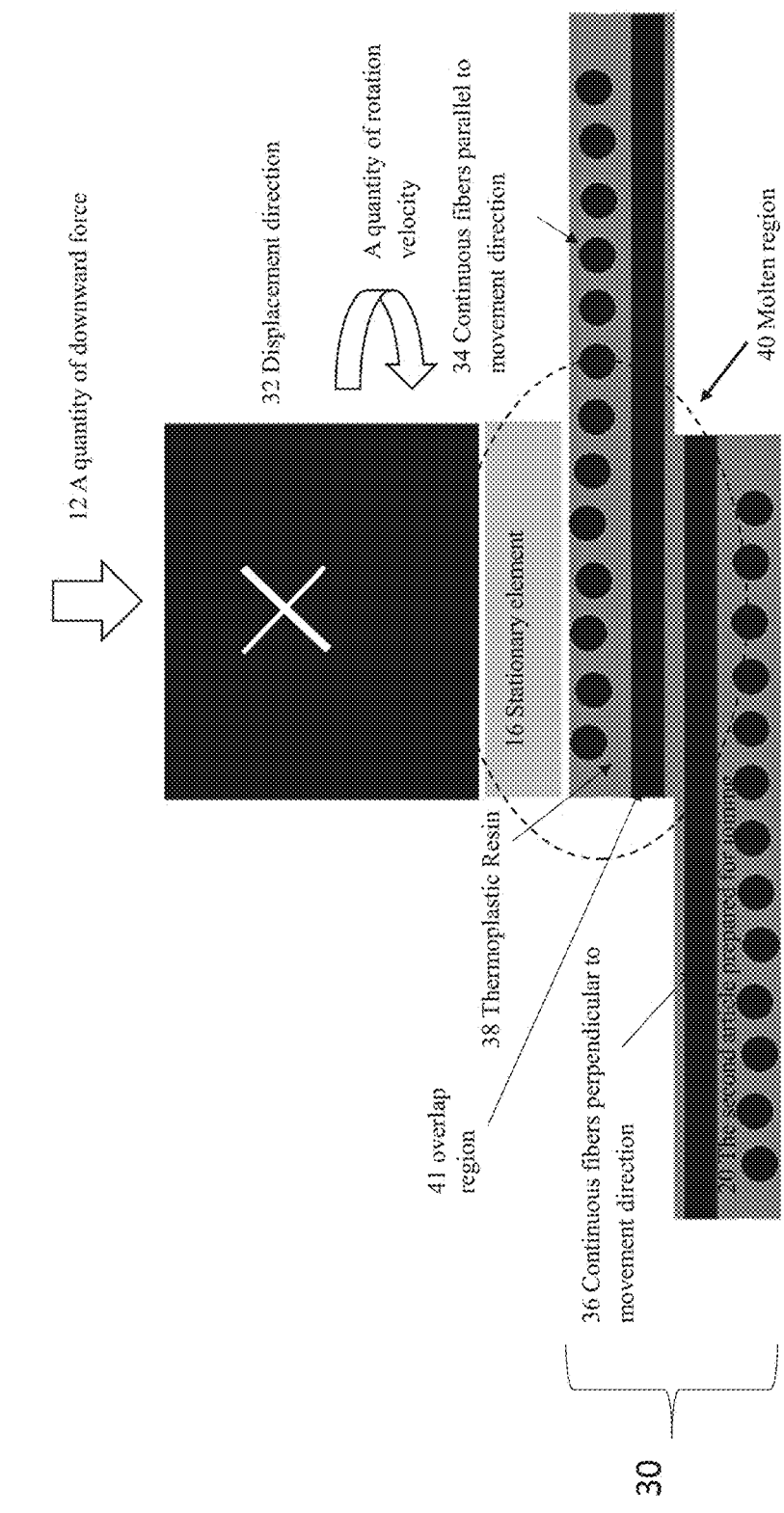
FIG. 2 illustrates a side view of a mechanical schematic of the operation of the joining method.

FIG. 2 illustrates a side view of a mechanical schematic of the joining process illustrating the joining of two continuously fiber reinforced thermoplastic articles 30. FIG. 2 further illustrates that the molten region 40 may not be identical to the overlapped region 41 between two articles. Furthermore, it is not necessary for the entire overlapped region 41 to be melted.

Figure 3:
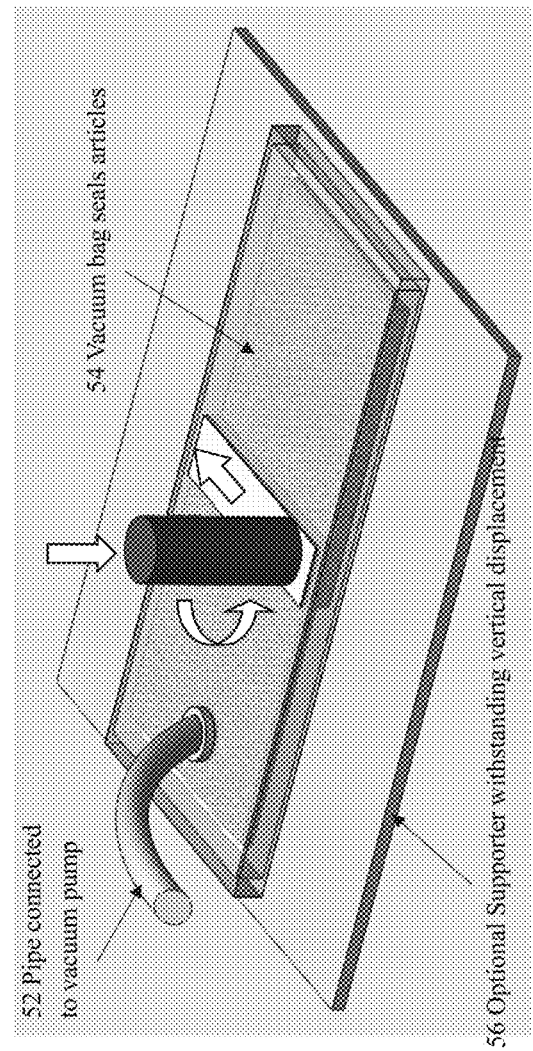
FIG. 3 illustrates a perspective view of a mechanical schematic of an alternative operation of the method shown in FIG. 1, in which case the joining process is achieved in a vacuum environment.

FIG. 3 illustrates a perspective view of a mechanical schematic of an alternative embodiment of the system and accompanying method shown in FIG. 1. In said embodiment, the joining process is best achieved by utilizing a vacuum environment 50. For some material combinations, e.g. joining titanium to fiber reinforced poly ether ether ketone, the existence of oxygen will deteriorate the strength of joining by introducing weak titanium oxides. In this case, the joining process is preferred to be operated in the presence of vacuum. A vacuum bag 54, attached with a pipe connected to a vacuum pump 52, is used to seal the articles to ensure the joining process is operated in vacuum environment. The vacuum bag 54 can be made by a plurality of materials.

Figure 4A:
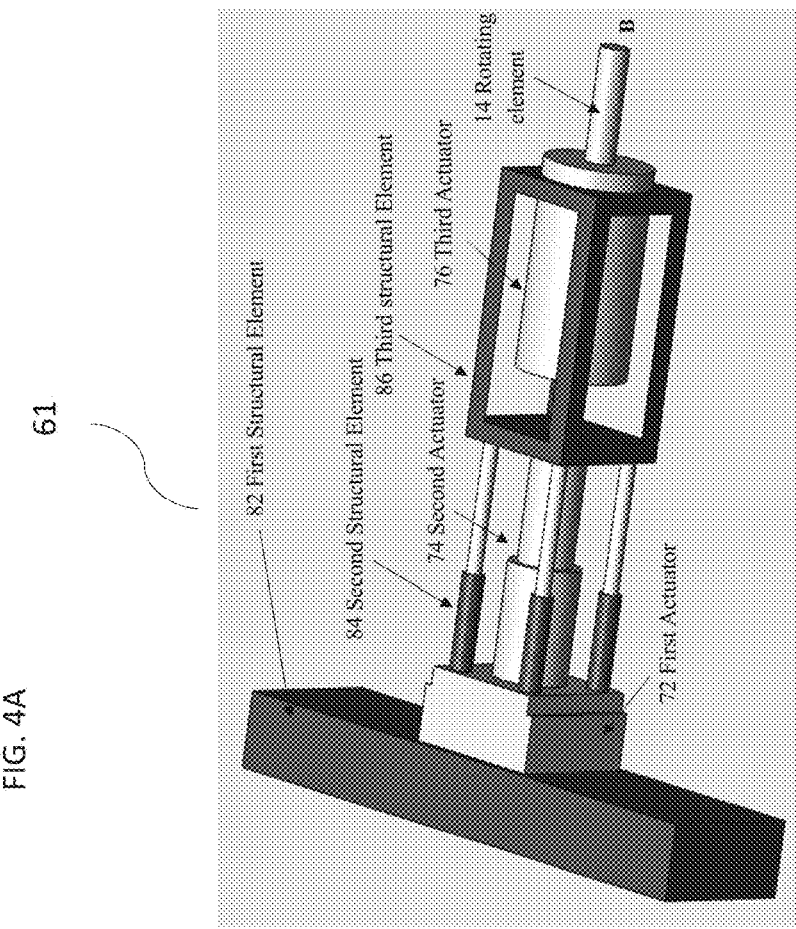
FIG. 4A illustrates an exploded view of the joining tool which is the direct implement for joining fiber reinforced thermoplastic to fiber reinforced thermoplastic and, for joining fiber reinforced thermoplastic to metals.

FIG. 4A illustrates an exploded view of the joining tool 61 for joining fiber reinforced thermoplastic to fiber reinforced thermoplastic and metal. The first actuator 72, accompanying with the support structure for the joining tool 82, enables an elaborate control of the displacement velocity of the rotating element 14 to move across the joining area. The second actuator 74, accompanying with the second structural element 84, enables an elaborate control of the downward force of the rotating element 14 subjected to the joining area. The third actuator 76, accompanying with the third structural element 86, enables an elaborate control of the rotation velocity of the rotating element 14.

Figure 4B:
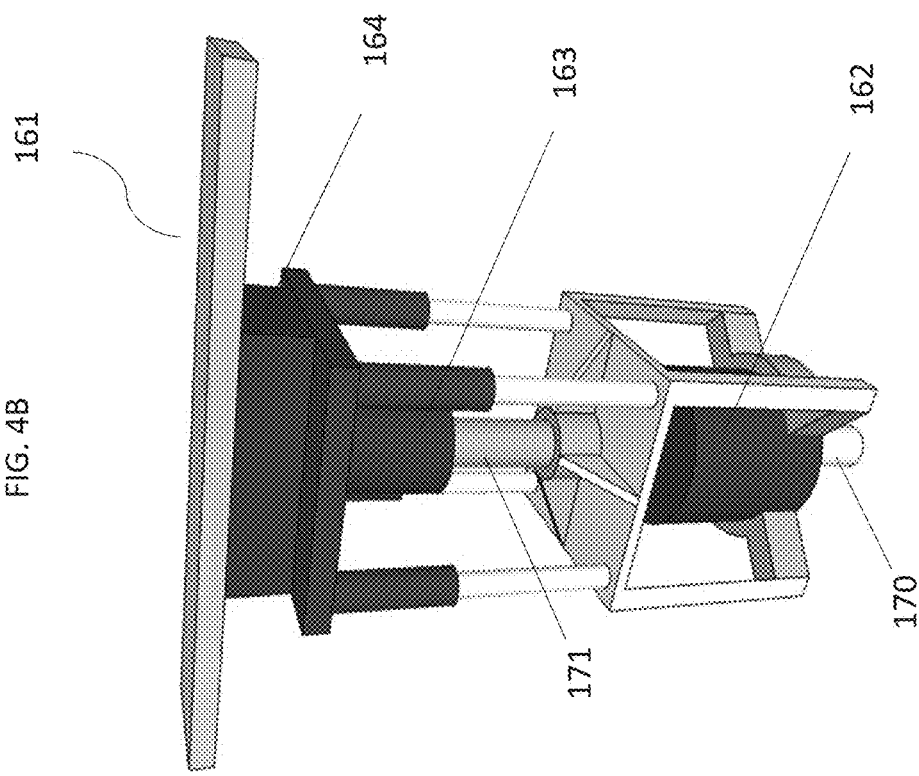
FIG. 4B illustrates an exploded view of an additional joining tool which is the direct implement for joining fiber reinforced thermoplastic to fiber reinforced thermoplastic and, for joining fiber reinforced thermoplastic to metals, illustrating a three actuator alignment including a rotational actuator, a vertical displacement actuator, and a horizontal displacement actuator 164.

FIG. 4B illustrates an exploded view of an additional embodiment of the joining tool 161 which is the direct implement for joining fiber reinforced thermoplastic to fiber reinforced thermoplastic and, for joining fiber reinforced thermoplastic to metals, illustrating a three actuator alignment including a rotational actuator 162 for driving the rotation of any embodiment of rotating element 170, a vertical actuator 163 for subjecting downward force with vertical element 171 upon the rotating element, and a horizontal actuator 164 for subjecting relative displacement of the rotating element.

Figure 5:
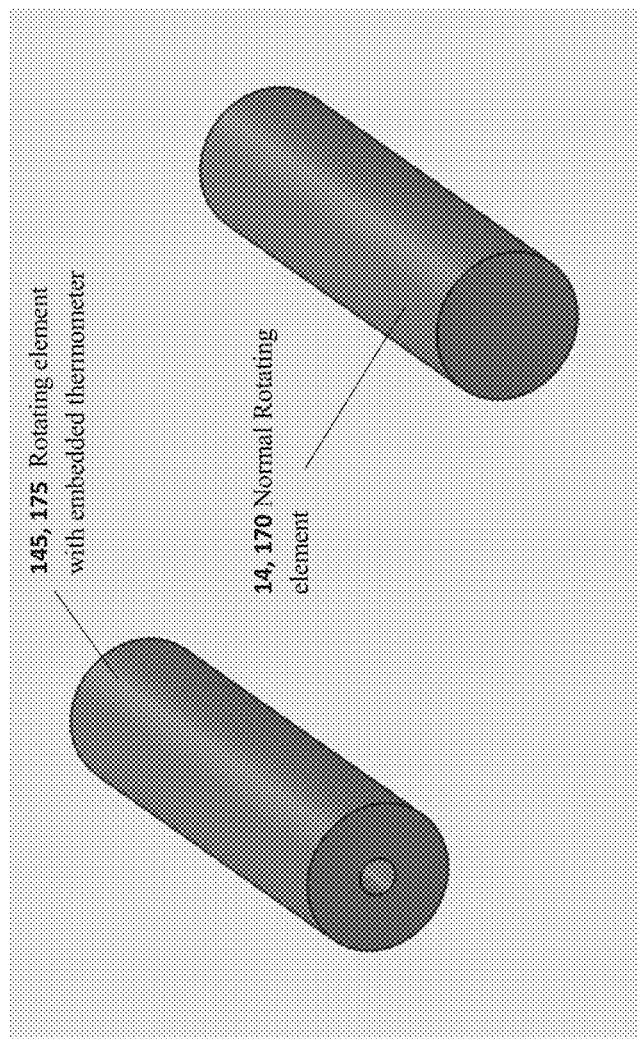
FIG. 5 illustrates a perspective view of the alternative rotating elements. which should be installed at the position of the dash box B in FIG. 4A.

FIG. 5 illustrates a perspective view of two alternative embodiments of rotating elements 14 which may be utilized in conjunction with either embodiment of the joining tools 61, 161 illustrated herein, for driving the rotation of rotating element either the joining tool 61, 161, in order to introduce the respective rotating element 14, 170 to the stationary element. Additionally, the base embodiment rotating elements 14, 170 comprise a solid component.

In an alternative embodiment the of rotating elements 145, 175 respectively, a thermometer may be embedded directly into the rotating element and thus, very accurate temperature readings at the joining area may be yielded in conjunction with a constant monitoring process or system, in order to facilitate the optimization of joining process.

Figure 6:
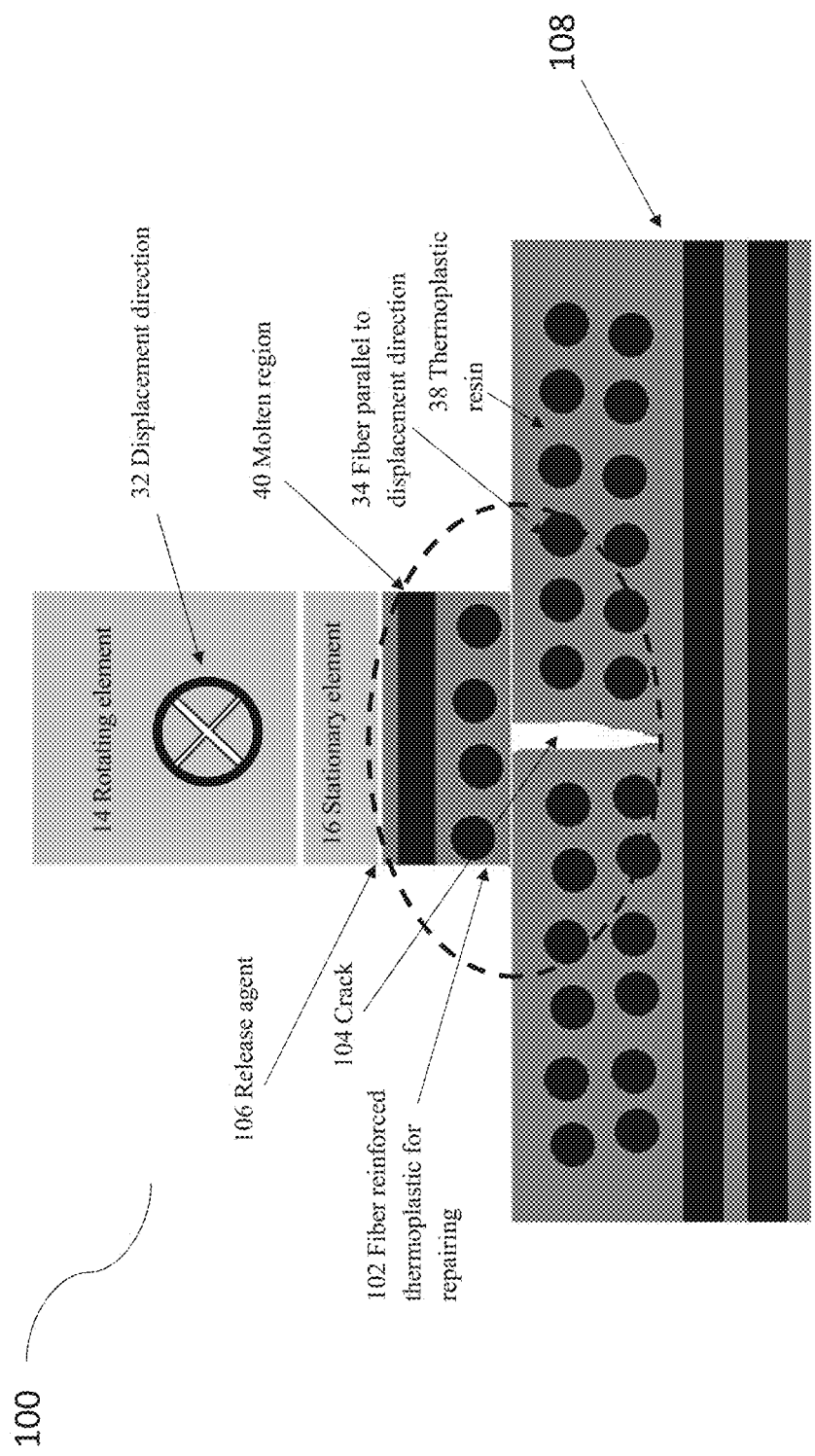
FIG. 6 illustrates a side view of a mechanical schematic of the first embodiment of the apparatus which is used for repairing defects and damage on fiber reinforced thermoplastic aero structures.

FIG. 6 illustrates a side view of a mechanical schematic of the first embodiment of the apparatus which is used for repairing defects and damage on fiber reinforced thermoplastic aero structures 100. This illustrates the first embodiment as the apparatus is used for repairing fiber reinforced thermoplastic aero structure 108 with cracks and damages 104. In this embodiment, the damaged aero structure 108 plays as the role of second article, while the first article is the fiber reinforced thermoplastic 102 used for repairing. Thermoplastic resin in the entire first article 102 and part of the damaged aero structure 108 adjacent to the crack 104 are melted, which are further fused together to achieve the target of repairing. In this case supporter may not be necessary if the rest of aero structure 108 can withstand downward force with negligible displacement. The stationary element 16 should be temporarily fixated, and release agent 106 is suggested to be inserted between the stationary element 16 and the first article 102 to facilitate the removal of the stationary element 16.

Figure 7:
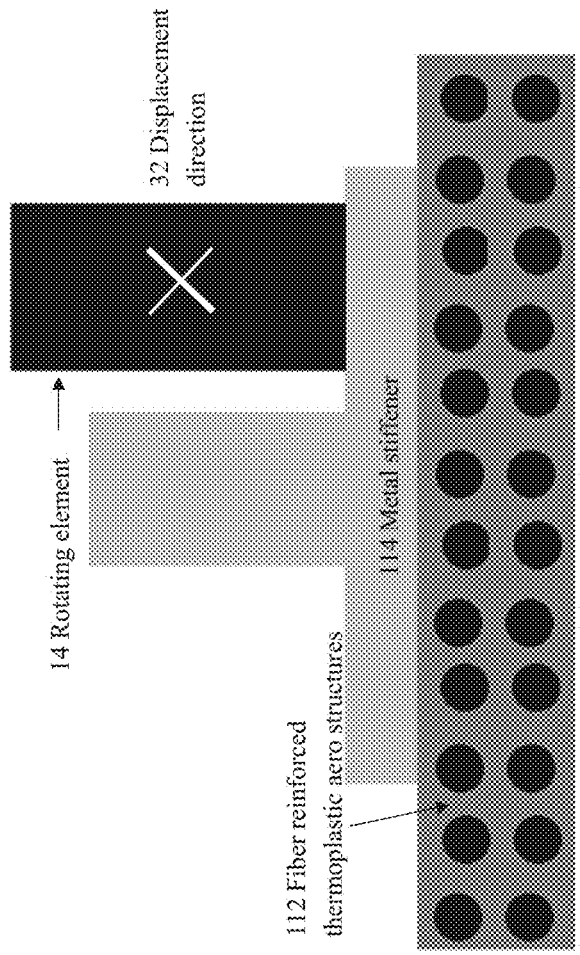
FIG. 7 illustrates a side view of a mechanical schematic of the second embodiment of the apparatus which is used for joining a metal feature to fiber reinforced thermoplastic aero structures.

FIG. 7 illustrates a side view of a mechanical schematic of the second embodiment of the apparatus which is used for joining a metal stiffener feature to fiber reinforced thermoplastic aero structures 110. At least one Metal stiffener 114 are joined with fiber reinforced thermoplastic aero structures 112. In this embodiment, the stationary element 16 is optional, depending on the property of metal stiffeners 114 and joining parameters.

Figure 8:
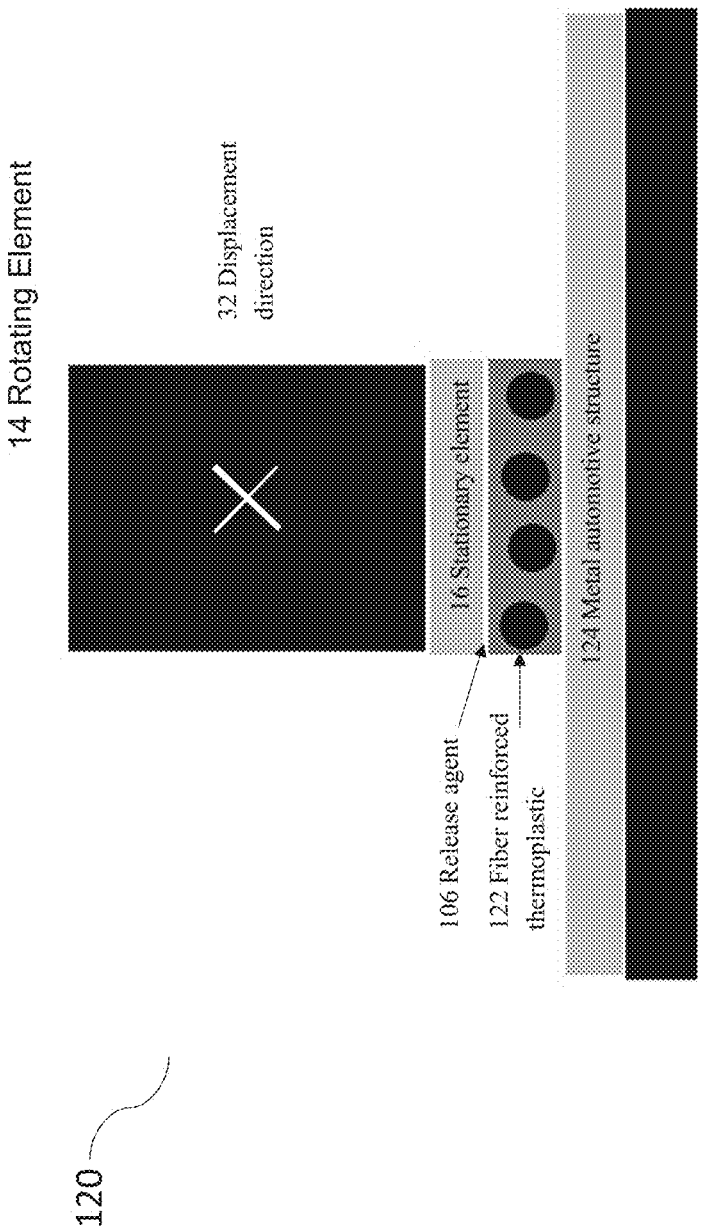
FIG. 8 illustrates a side view of a mechanical schematic of the third embodiment of the apparatus which is used for joining fiber reinforced thermoplastic to reinforced metal automotive structures.

FIG. 8 illustrates a side view of a mechanical schematic of the third embodiment of the apparatus which is used for joining fiber reinforced thermoplastic to reinforced metal automotive structures 120, increasing the stiffness and strength of that structure. Fiber reinforced thermoplastic 122 is joined with the metal automotive structure 124 as the second article. The metal surface can be treated to facilitate the joining performance between metal and thermoplastic composite. The stationary element 16 should be temporarily fixated or restrained, and the release agent 106 is suggested to be inserted between the stationary element 16 and the fiber reinforced thermoplastic 124 to facilitate the removal of the stationary element 16. The rotation velocity of the rotating element 14 should be elaborated to melt the thermoplastic resin in the fiber reinforced thermoplastic 122. An optional supporter of metal structure 126 may be required to withstand the downward force which may deform the metal structure.

Figure 9:
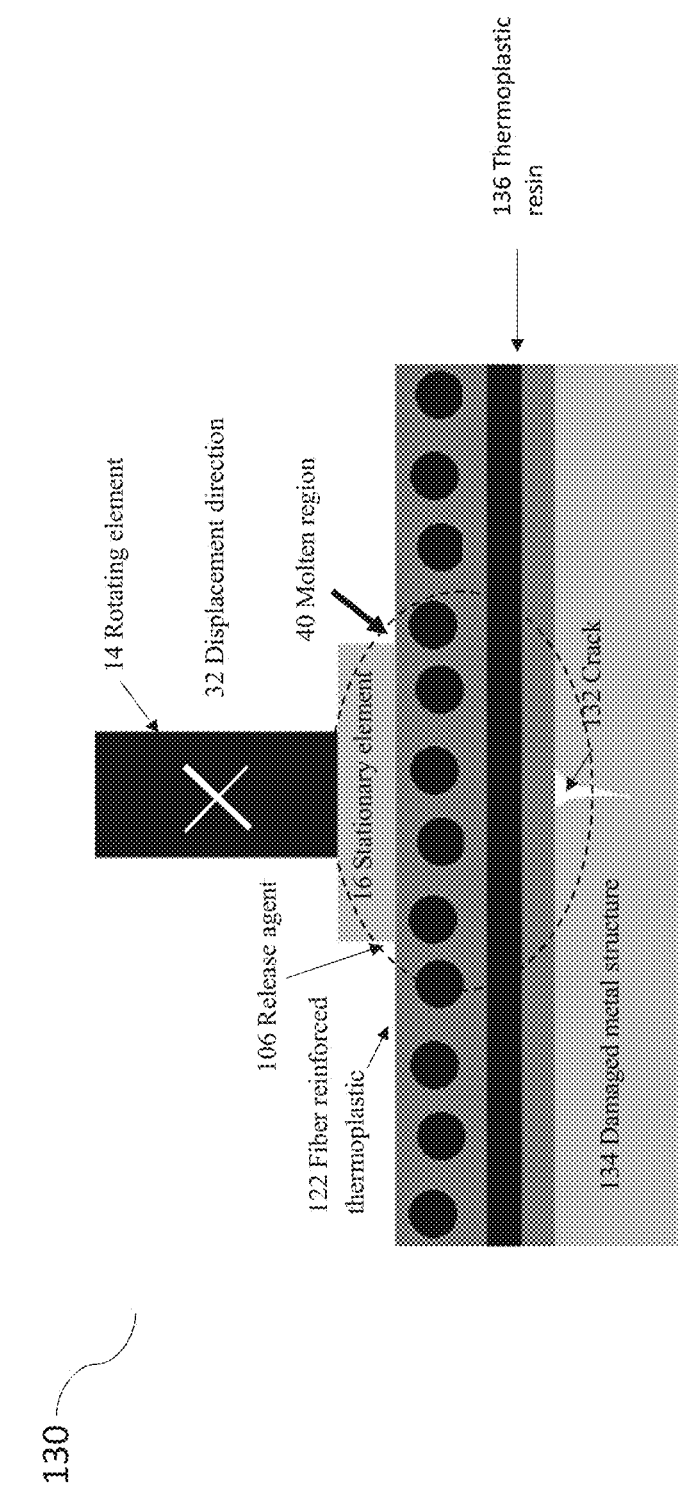
FIG. 9 illustrates a side view of a mechanical schematic of the fourth embodiment of the apparatus which is used for joining fiber reinforced thermoplastic to repair damaged metal civil structures.

FIG. 9 illustrates a side view of a mechanical schematic of the fourth embodiment of the apparatus which is used for joining fiber reinforced thermoplastic to repair damaged metal civil structures 130. In this embodiment the damaged metal structure 134 is the second article, while the first article is the fiber reinforced thermoplastic 122 employed for repairing. Thermoplastic resin in molten region 40 is melted, and the molten thermoplastic resin 136 in the first article will flow into the crack 132 and the undamaged metal surface will also bond with the fiber reinforced thermoplastic 122.

The damaged metal structure 134 is thus reinforced by the joined fiber reinforced thermoplastic 122. In this case supporter may not be necessary if the metal structure 134 can withstand downward force with negligible displacement. The stationary element 16 should be temporarily fixated, and release agent 106 is suggested to be inserted between the stationary element 16 and the fiber reinforced thermoplastic 122 to facilitate the removal of the stationary element 16.

Figure 10:
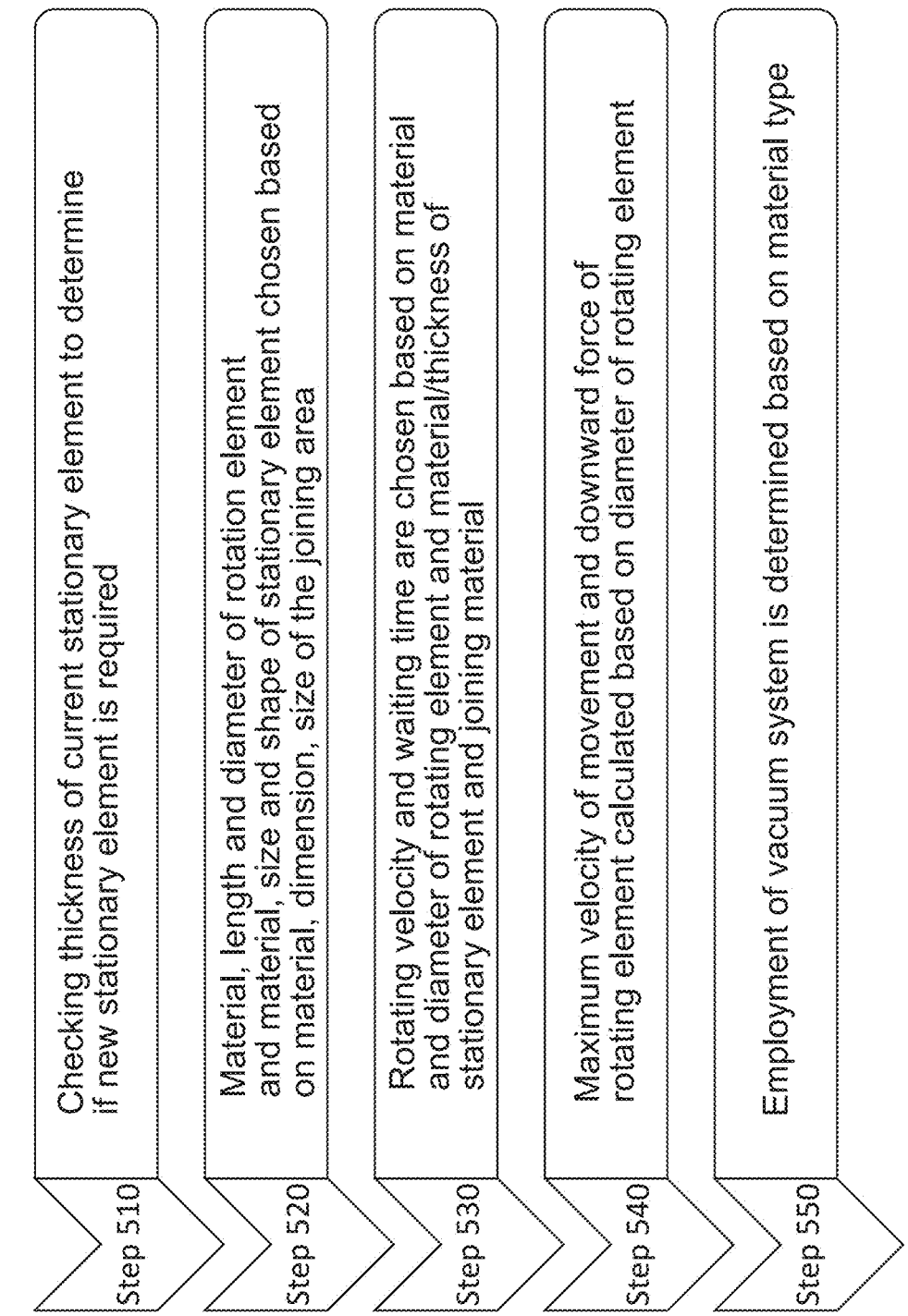
FIG. 10 illustrates a flow chart of the method for joining fiber reinforced thermoplastics to fiber reinforced thermoplastics or metal through use of the present apparatus.

FIG. 10 illustrates a flow chart of the method for joining fiber reinforced thermoplastics to fiber reinforced thermoplastics or metal through use of the present apparatus. At step 510 the thickness of current stationary element is checked to decide whether new stationary element is required. At step 520 the Material, length and diameter of rotation element, and material, size and shape of stationary element are chosen based on the material, dimension and size of the joining area. At step 530 the rotating velocity and waiting time before moving are chosen based on the material and diameter of rotating element, material and thickness of stationary element and material for joining. At step 540 the maximum velocity of movement and subjected downward force of rotating element are calculated based on the diameter of rotating element. At step 550 the employment of the vacuum system is decided according to the material type.

What is claimed is:

1. A method for joining a first fiber reinforced thermoplastic to a second fiber reinforced thermoplastic and metal comprising:
    employing at least one stationary member;
    employing at least one rotational element;
    checking a thickness of the at least one stationary member;
    employing a certain rotational velocity of the at least one rotational element;
    approaching the at least one rotational element to the at least one stationary member in contact to generate heat to a joining temperature to melt thermoplastic resin in the first fiber reinforced thermoplastic and the second fiber thermoplastic and metal;
    employing a displacement of the at least one rotational element on a joining area; and
    employing a designated downward force of the at least one rotational element and the at least one stationary member to offer an intimate contact between the first fiber reinforced thermoplastic and the second fiber reinforced thermoplastic, and between the first fiber reinforced thermoplastic and the metal;
    wherein an area and shape of the at least one stationary member should at least fully cover the joining area;
    wherein a length of the at least one rotational element should not exceed five times a diameter of the at least one rotational element and the diameter of the at least one rotational element is determined based on a size and a shape of the joining area;
    wherein the thickness of the at least one stationary member is between 2 mm and 4 mm for aluminum alloy;
    wherein the certain rotational velocity is determined based on a material and the diameter of the at least one rotational element, a material and the thickness of the stationary member, and materials for joining;
    wherein the joining temperature equals to a melting point of thermoplastic plus 50 degree Celsius;
    wherein a maximum velocity of displacement is calculated as the diameter of the at least one rotational element per second and a minimum time for displacing the at least one rotational element from its original location to an adjacent location without overlap or gap should be one second; and
    wherein the designated downward force is calculated based on the diameter of the at least one rotational element, which equals to the area of the at least one rotational element ($mm^2$) multiplied by 0.2 to 2.

2. The method for joining the first fiber reinforced thermoplastic to the second fiber reinforced thermoplastic and metal of claim 1 further comprising the steps of:
    employing a vacuum system to improve the performance of joining and avoid oxidation; and
    choosing a vacuum system according to the materials for joining.

3. The method for joining the first fiber reinforced thermoplastic to the second fiber reinforced thermoplastic and metal of claim 2 further comprising the step of:
    choosing polyimide as the material of vacuum bag when joining titanium and fiber reinforced thermoplastics.

4. The method for joining the first fiber reinforced thermoplastic to the second fiber reinforced thermoplastic and metal of claim 1 further comprising the step of:
    selecting the rotational element from a group consisting of a solid component and a component with thermometer embedded.

* * * * *